US011900631B2

(12) United States Patent
Ringuette et al.

(10) Patent No.: US 11,900,631 B2
(45) Date of Patent: Feb. 13, 2024

(54) OPERATING MODE CHANGE BY IMAGE COMPARE

(71) Applicant: Lenovo (Singapore) Pte. Ltd., Singapore (SG)

(72) Inventors: Justin Michael Ringuette, Morrisville, NC (US); Mark Summerville, Apex, NC (US); Richard Todd Wall, Clayton, NC (US); Sandy Collins, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 381 days.

(21) Appl. No.: 17/156,449

(22) Filed: Jan. 22, 2021

(65) Prior Publication Data
US 2022/0237820 A1 Jul. 28, 2022

(51) Int. Cl.
*G06F 1/16* (2006.01)
*G06T 7/73* (2017.01)
*G06F 3/02* (2006.01)
*H04N 23/54* (2023.01)
*H04N 23/57* (2023.01)
*H04N 23/60* (2023.01)

(52) U.S. Cl.
CPC .............. *G06T 7/74* (2017.01); *G06F 1/1618* (2013.01); *G06F 1/1681* (2013.01); *G06F 1/1686* (2013.01); *G06F 3/02* (2013.01);

*H04N 23/54* (2023.01); *H04N 23/57* (2023.01); *H04N 23/60* (2023.01)

(58) Field of Classification Search
CPC ....... G06T 7/74; G06F 1/1618; G06F 1/1681; G06F 1/1686; G06F 3/02; G06F 1/1643; G06F 1/1677; G06F 1/203; G06F 1/206; H04N 23/54; H04N 23/57; H04N 23/60; H04N 23/90
See application file for complete search history.

(56) References Cited

U.S. PATENT DOCUMENTS

| | | | | |
|---|---|---|---|---|
| 2011/0115922 | A1* | 5/2011 | Shimizu | G06T 7/80 348/188 |
| 2011/0205155 | A1* | 8/2011 | Newton | G06F 3/011 345/157 |
| 2014/0184854 | A1* | 7/2014 | Musatenko | H04N 23/69 348/240.2 |

* cited by examiner

*Primary Examiner* — Mekonnen D Dagnew
(74) *Attorney, Agent, or Firm* — Schwegman Lundberg & Woessner, P.A.

(57) ABSTRACT

A device includes a first camera and a second camera respectively supported by a first and a second assemblies coupled via a hinge. The first and the second cameras are configured to respectively capture a first image and a second image that include a common reference object. A controller is coupled to the first and the second cameras, and configured to change an operating mode of the device in response to a comparison between the first and the second images. Additional cameras may be used in further embodiments and may be mounted onto the front and back surfaces of the first and the second assemblies.

20 Claims, 4 Drawing Sheets

OPERATING MODE CHANGE BY IMAGE COMPARE

BACKGROUND

Some devices (such as convertible laptops with LCD and keyboard assemblies) can be used in a laptop mode (or a notebook mode) and a tablet mode, and are capable of triggering device state changes in response to detecting movement between the LCD and keyboard assemblies. The device state changes may include enabling and disabling keyboard and pointing devices to prevent accidental inputs, changing screen contents to improve usability as a tablet device, and changing system performance when cooling vents are obstructed, for example. However, detection of movement between the LCD and keyboard assemblies may need expensive elements (such as accelerometers) and complicated calculations, and thus may be costly and consume additional available space.

SUMMARY

A device includes a first camera and a second camera respectively supported by a first and a second assemblies coupled via a hinge. The first and the second cameras are configured to respectively capture a first image and a second image that include a common reference object. A controller is coupled to the first and the second cameras and configured to change an operating mode of the device in response to a comparison between the first and the second images. Additional cameras may be used in further embodiments and may be mounted onto the front and back surfaces of the first and the second assemblies.

DETAILED DESCRIPTION

Figure 1A:
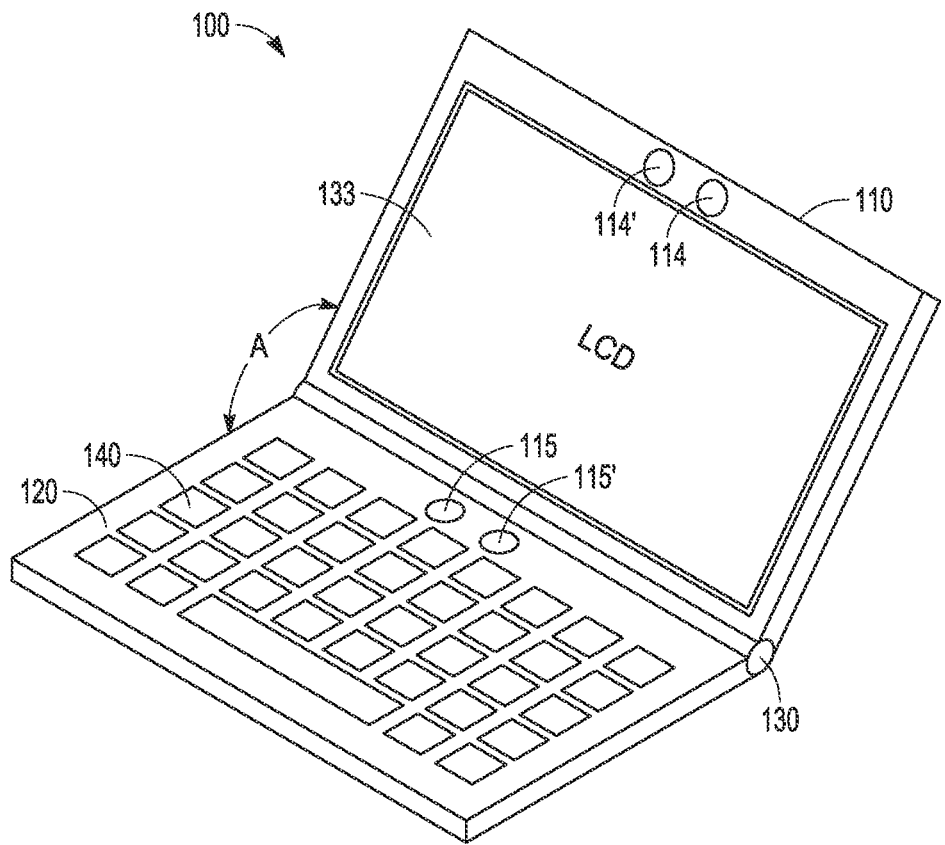
FIGS. 1A and 1B are block diagrams of an electronic device having two cameras respectively on two assemblies according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Figure 1B:
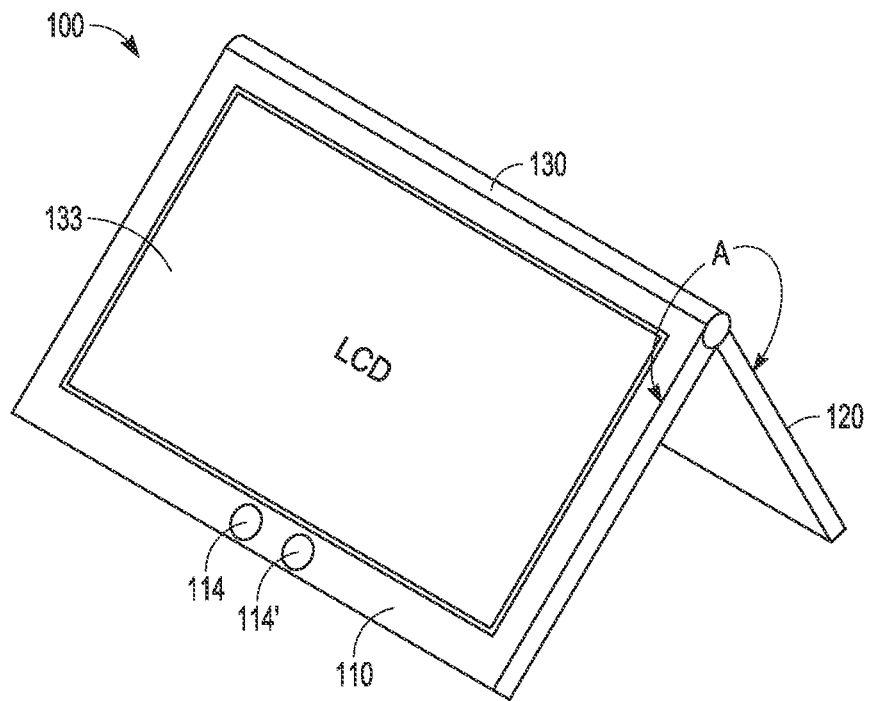

FIGS. 1A and 1B are block diagrams of an electronic device 100 (such as a laptop or notebook) having first and second cameras 114 and 115 respectively mounted on two assemblies 110 and 120 according to an example embodiment. A first assembly 110 may have an LCD display 133 on its front surface. A second assembly 120 may have a keyboard 140 on its front surface, and a system board (not shown in the figures) inside. The first assembly 110 and the second assembly 120 are coupled by a hinge 130. The assemblies can rotate respective to each other around the hinge 130, such that the first assembly 110 can flip with respect to the second assembly 120 around the hinge 130 to form different configurations of device 100 as shown.

A relative angle A between the first and second assemblies 110 and 120 can be determined by processing images respectively captured by the first camera 114 and the second camera 115 of the device 100. The device 100 can be a convertible device (such as a flip laptop or notebook), and can convert between a laptop operating mode and a tablet operating mode based on the relative angle A between front surfaces of the first assembly 110 and the second assembly 120.

As shown in FIG. 1A, when the device 100 being intended to be used as in the laptop operating mode, the relative angle A is usually in a range between 90° and less than 180° (e.g. at 135°) in a so-called "clam" shape. As shown in FIG. 1B, when the device 100 is intended to be used in the tablet operating mode, the relative angle A is usually in a range between 180° and 360° (e.g. at 225°) in a so-called "tent" shape.

Usually, the keyboard 140 of the second assembly 120 is enabled when the device 100 is working in the laptop operating mode, while the keyboard 140 of the second assembly 120 is disabled when the device 100 is working in the tablet operating mode. In the tablet operating mode, the second assembly 120 including the keyboard 140 is used as a kickstand for the LCD display 133 of the first assembly 110.

Figure 2:
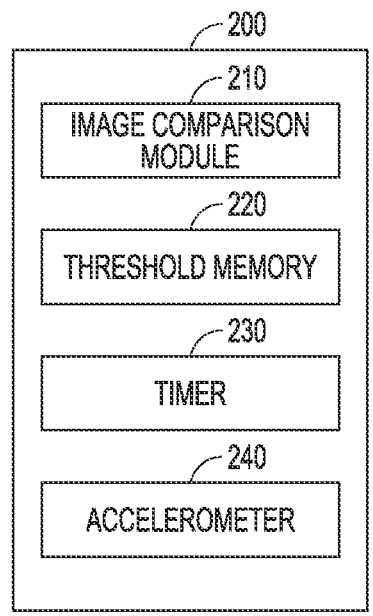
FIG. 2 is a block schematic diagram of a controller in the electronic device according to an example embodiment.

The device 100 may include a controller 200 (as shown in FIG. 2) that is coupled to the first camera 114 and the second camera 115 to respectively receive a first image and a second image, and is configured to change the operating mode of the device 100 in response to comparing of the first image and the second image.

The relative angle A formed between the front surfaces of the first assembly 110 and the second assembly 120 can be in a range between 0° and 360° for example. When the relative angle A=0°, the device 100 is correspondingly in an unopened (or closed) state. When the relative angle A=180°, the front surfaces of the first assembly 110 and the second assembly 120 correspondingly face the same direction, and thus the first camera 114 and the second camera 115 correspondingly face the same direction. When the relative angle A=360°, the front surfaces of the first assembly 110 and the second assembly 120 correspondingly face the opposite directions, and thus the first camera 114 and the second camera 115 correspondingly face the opposite directions.

In some embodiments, when the relative angle A is detected increasing and has reached a threshold angle (e.g., 180°), the operating mode of the device 100 will be converted into the tablet operating mode. Otherwise, when the relative angle A is detected decreasing and has reached the threshold angle, the operating mode of the device 100 will be converted into the laptop operating mode.

As illustrated in FIG. 1A, two cameras 114 and 115 are used in the device 100, however, the number of the cameras can be more than two. For example, the device 100 may include additional cameras 114' and 115' respectively mounted onto the front and/or back surfaces of the first and the second assemblies 110 and 120. Thus, device 100 may include at least one additional camera mounted onto at least one of surface of the first and the second assemblies to provide further images for comparing.

FIG. 2 is a block schematic diagram of a controller 200 installed in the electronic device 100 according to an example embodiment. The controller 200 can be installed within a system board of the second assembly 120. Alternatively, the controller 200 can also be installed within a system board the first assembly 110.

The controller 200 is coupled to the first camera 114 and the second camera 115, and configured to change an operating mode of the device in response to a comparison between the first and the second images. The controller 200 may include an image comparison module 210, a threshold memory 220, a timer 230, and an accelerometer 240 for example.

The image comparison module 210 can compare the first image and the second image captured by the first camera 114 and the second camera 115, calculate an overlap percentage of the first image and the second image, and determine a relative angle A between front surfaces of the first assembly 110 and the second assembly 120 based on the overlap percentage. The image comparison module 210 can be a commercially available module.

In some embodiments, the first and the second images from the first camera 114 and the second camera 115 may correspond to overlapping fields of view, each overlapping field containing a common reference object. The image comparison module 210 may determine a difference in angle between the first and the second images of the common reference object. Thus, the image comparison module 210 can use the common reference object to determine the relative angle A between front surfaces of the first assembly 110 and the second assembly 120. The controller 200 thus can change the operating mode of the device 100 as a function of a difference between the relative angle A and a threshold angle T.

The common reference object can be selected from still frames and video frames captured by the first and the second cameras. The controller 200 may select the common reference object from candidate objects based on factors such as shape simplicity, edge clarity, and color contrast of the candidate objects. For example, a candidate object that has a simpler shape (such as a round shape or a rectangular shape), a clearer edge, or a greater color contrast may be selected as the common reference object in order to determine the relative angle. For example, the common reference object can be a user in front of the first assembly 110 and the second assembly 120 of the device 100, or an object such as a lamp is captured by both the first camera 110 and the second camera 120. The common reference object needs to appear in both fields of view and can change as the fields of view change due to the changes in angles of the surfaces.

Figure 5A:
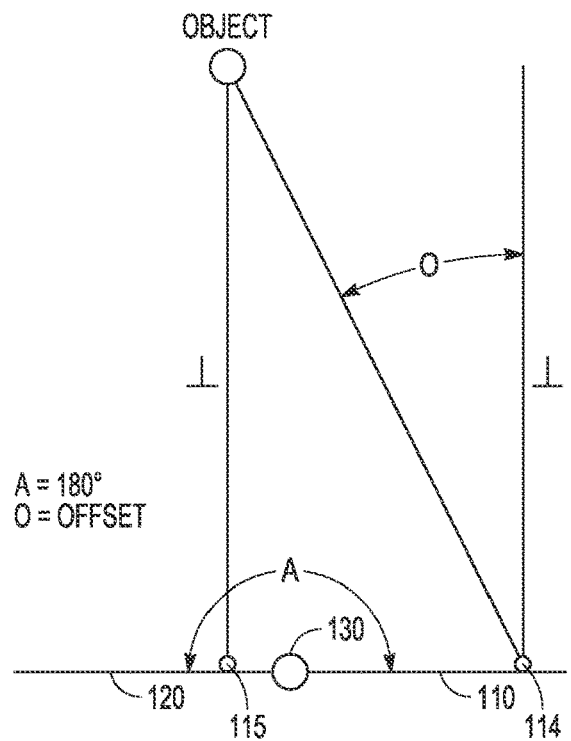
FIGS. 5A and 5B show fields of view of an object according to an example embodiment.
Figure 5B:
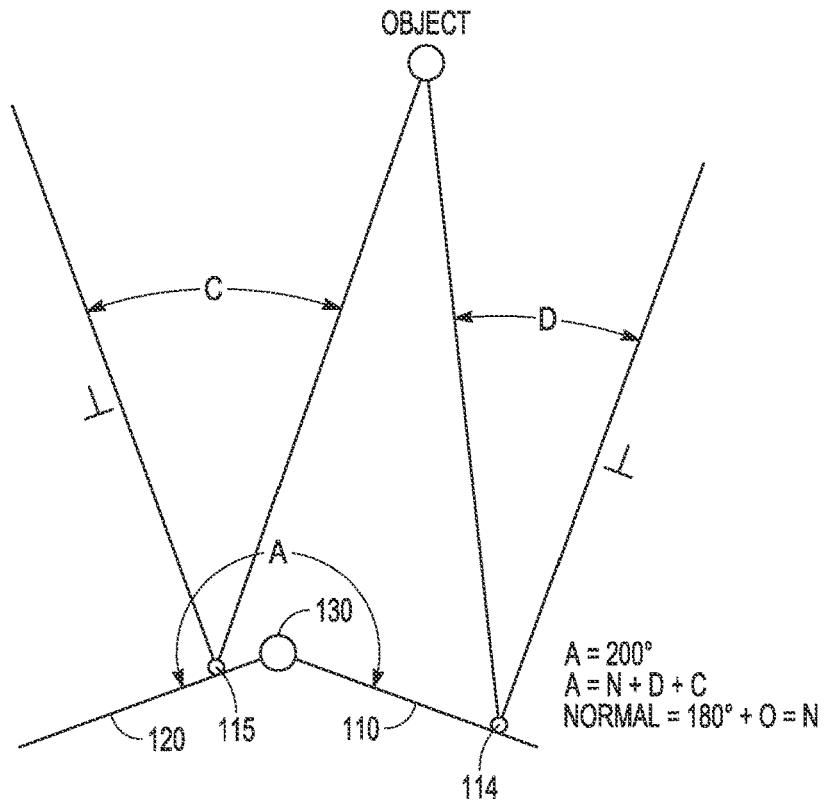

Also, the distance to an object (such as the common reference object) may be ignored in the calculation of the angles (such as the relative angle), unless the object is very close, in which case the lateral spacing between cameras is no longer negligible. Referring to FIGS. 5A and 5B, symbol ⊥ represents a perpendicular center line of a field of view that is orthogonal to a surface (such as a front surface of the first assembly 110 or the second assembly 120. The example as shown in FIGS. 5A and 5B assumes one camera is pointing directly at the object, otherwise there would be an offset O to that camera. If the object is closer, the offset O will be larger and thus the distance to the object should be known in order to calculate the relative angle. The distance may be determined by various means such as based on the size of a known object or via separate sensor. In addition, cameras 114 and 114' are shown a fixed distance apart from each other. The distance to an object may be calculated utilizing angle/side/angle calculations from images of the object obtained from cameras 114 and 114'.

While the above describes determining angle A via translation, angle A may also or alternatively be found via transformation. Angle A may be determined based on a change in apparent size and shape due to the cameras' different perspectives. For example, flat text or features are invisible when viewed along their face (they have zero thickness) and their size increases as the viewing angle increases to 90 degrees. Similarly, a cylindrical lamp which may appear the same shape to both cameras will appear different sizes when the cameras are at different distances to it. Note that these two methods, translation and transformation, may be used in isolation for special simple cases or combined to solve for hinge angle A using less ideal reference objects.

Image comparison module 210 may operate in a manner similar to standard computer vision tracking systems utilizing feature point trackers, patch trackers, or key point trackers that utilize image features to re-localize cameras to a coordinate system. Once such a feature, such as an object is identified, the relative offset angle from the orthogonal of each camera field of view can be determined and simply combined to determine angle A. In one embodiment, the cameras are supported by the respective assemblies such that their fields of view extend orthogonal to the surfaces of the respective assemblies. Such an orientation simplifies calculations of the angle A based on images, as no calibration offsets are required. However, if cameras do not have fields of view orthogonal to the surfaces, calibration offsets may be used in the calculation of angle A.

The threshold memory 220 may store one or more threshold angles T that can be used for determining the operating mode change of the device. The controller 200 may compare the relative angle A (e.g., determined by the image comparison module 210) with the stored threshold angle T, and change the operating mode of the device 100 in response to the relative angle A reaching the threshold angle T. In some embodiment, the threshold angle T is approximately 180°. In some embodiments, the threshold angle T is in a range approximately between 170° and 190°.

In some embodiments, the timer 230 can be settable to periodically trigger the first camera 110 and the second camera 120 of the device 100 at a constant time interval (such as every 1 or 2 seconds, more or less) to capture the first and the second images in order to determine whether to change the operating mode of the device 100.

In some embodiments, the accelerometer 240 can detect a motion of the device 100 to trigger the first camera 114 and the second camera 115 to capture the first and the second images in order to determine whether to change the operating mode of the device 100. The motion of the device 100 may include a motion of the first assembly 110, a motion of the second assembly 120, or a motion of both the first assembly 110 and the second assembly 120. The first camera 114 and the second camera 115 are thus triggered in a default passive polling way.

In some embodiments, a device 100 may include a first camera 114 and a second camera 115 supported by respective hinged surfaces of the device and configured to capture a first and a second images of a common reference object, an image comparison module 210 for determining a relative angle between the respective hinged surfaces, and means for changing an operating mode of the device in response to a comparison of the relative angle and a threshold angle. The operating modes described above may be changed by system software in response to receiving results of the comparison. In some embodiments, the image comparison module 210 may determine the relative angle by analyzing the first and the second images, calculating an overlap percentage of the first and the second images of the common reference object, and calculating the relative angle based on the overlap percentage.

Figure 3:
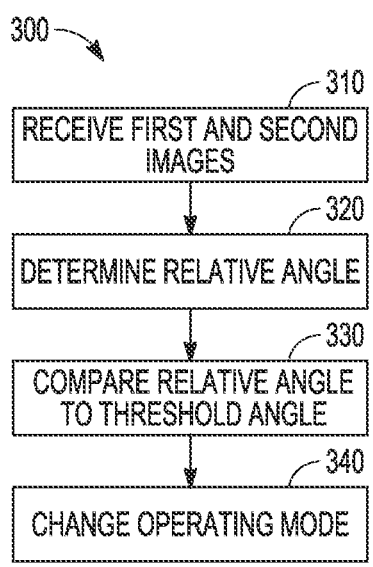
FIG. 3 is a flowchart illustrating a method of changing an operating mode of the electronic device according to an example embodiment.

FIG. 3 is a flowchart illustrating a method 300 of changing an operating mode of the electronic device 100 according to an example embodiment. The method 300 includes an operation 310 that receives a first image and a second image respectively from the first camera 114 and the second camera 115, which are respectively supported by front surfaces of the first assembly 110 and the second assembly 120 hinged by the hinge 130 of the device 100. At operation 320, a relative angle A between front surfaces of the respective hinged assemblies 110 and 120 is determined. At operation 330, the relative angle A is compared to a threshold angle T. At operation 340, an operating mode of the device 100 is changed in response to a comparison result of the relative angle A and the threshold angle T.

In some embodiments, a common reference object (such as a user at a relatively close distance or a lamp at a relatively far distance) is determined to be captured by the first camera 114 and the second camera 115 based on based on factors such as shape simplicity, edge clarity, and color contrast of the candidate objects.

In some embodiments, the relative angle A between front surfaces of the respective hinged assemblies 110 and 120 is determined by analyzing the first and the second images, calculating an overlap percentage of the first and the second images of the common reference object, and calculating the relative angle A based on the overlap percentage.

Therefore, the electronic device can determine an operating mode change in response to capturing images by a pair of cameras separated by a hinge joint without need of costly and space-taking apparatus, and thus is inexpensive and space-saving.

Figure 4:
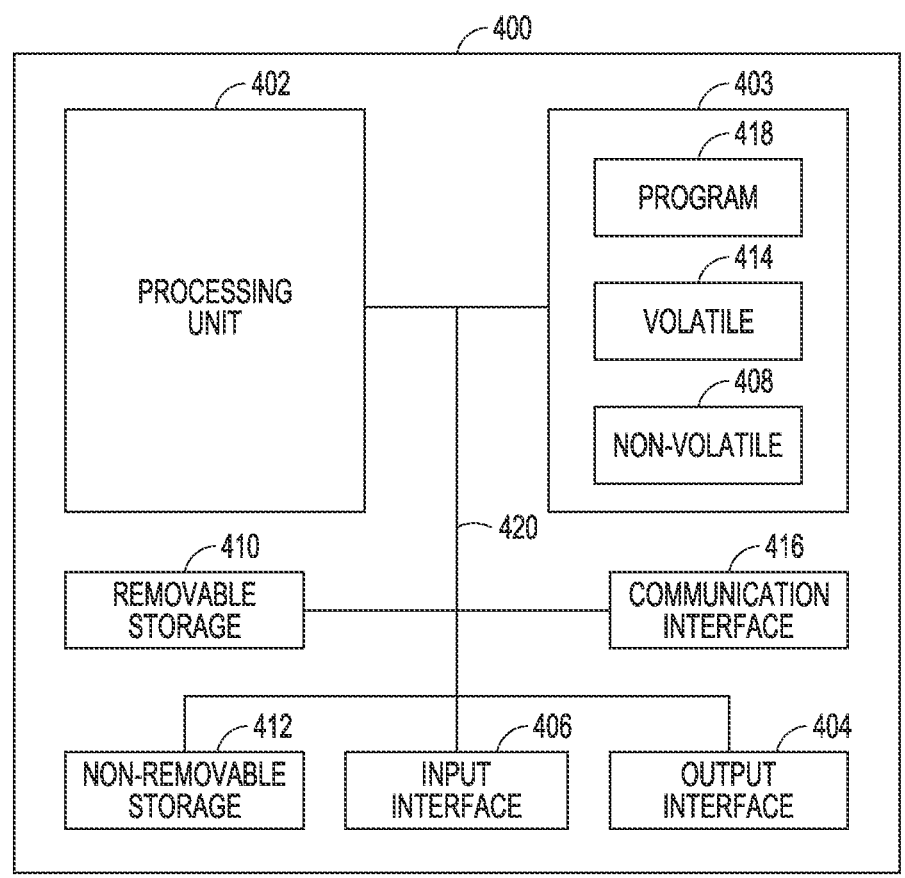
FIG. 4 is a block schematic diagram of a computer system to implement one or more example embodiments.

FIG. 4 is a block schematic diagram of a computer system 400 to implement one or more controllers and devices, as well as for performing methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves to the extent carrier waves are deemed too transitory. Storage can also include networked storage, such as a storage area network (SAN). Computer program 418 along with the workspace manager 422 may be used to cause processing unit 402 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
a first camera supported by a first assembly;
a second camera supported by a second assembly;
a hinge coupling the first and second assemblies to facilitate rotation of the first and the second assemblies about the hinge; and
a controller coupled to respectively receive a first image and a second image from the first and the second cameras and configured to change an operating mode of the device in response to comparing of the first and the second images to determine the relative angle between the first assembly and the second assembly.

2. The device of claim 1, wherein the first assembly comprises an LCD display, and wherein the second assembly comprises a keyboard and the controller.

3. The device of claim 2, wherein the mode of the device is selected from a group consisting of a laptop mode and a tablet mode.

4. The device of claim 3, wherein the keyboard is enabled in the laptop mode, and wherein the keyboard is disabled in the tablet mode.

5. The device of claim 1, wherein the first and the second images correspond to overlapping fields of view that each contain a common reference object, and wherein the controller determines the relative angle between the first assembly and the second assembly based on a difference in angle between the first and the second images of the common reference object.

6. The device of claim 5, wherein the controller changes the operating mode as a function of the difference in angle compared to a threshold angle.

7. The device of claim 5, wherein the common reference object is selected from still frames and video frames captured by the first and the second cameras.

8. The device of claim 5, wherein the controller selects the common reference object from candidate objects based on factors comprising at least one of shape simplicity, edge clarity, and color contrast of the candidate objects.

9. The device of claim 1, wherein the controller comprises an image comparison module configured to compare the first and second images, calculate an overlap percentage of the first and second images, and determine the relative angle between the first and the second surfaces based on the overlap percentage.

10. The device of claim 9, wherein the controller is configured to compare the relative angle with a threshold angle, and to change the mode of the device in response to the relative angle reaching the threshold angle.

11. The device of claim 10, wherein the threshold angle is approximately 180°.

12. The device of claim 10, wherein the threshold angle is in a range approximately between 170° and 190°.

13. The device of claim 1 further comprising a timer to periodically trigger at a constant time interval the first and the second cameras to capture the first and the second images.

14. The device of claim 1 further comprising an accelerometer to detect a motion of the device to trigger the first and the second cameras to capture the first and the second images.

15. The device of claim 14, wherein the motion of the device comprises a motion of the first assembly or the second assembly or both.

16. The device of claim 1 and further comprising at least one additional camera mounted onto at least one of surface of the first and the second assemblies to provide further images for comparing.

17. A device comprising:
a first camera and a second camera supported by respective hinged surfaces of the device, and configured to capture a first and a second images of a common reference object;
means for determining a relative angle between the respective hinged surfaces; and
means for changing an operating mode of the device in response to a comparison of the relative angle and a threshold angle.

18. A computer implemented method comprising:
receiving a first image and a second image from a first and a second camera supported by respective hinged assemblies of a device;
determining a relative angle between the respective hinged assemblies;
comparing the relative angle to a threshold angle; and changing an operating mode of the device in response to the comparing of the relative angle to the threshold angle.

19. The method of claim 18 further comprising determining a common reference object to be captured by the first and the second cameras.

20. The method of claim 19, wherein the determining the relative angle comprises:
- analyzing the first and the second images;
- calculating an overlap percentage of the first and the second images of the common reference object; and
- calculating the relative angle based on the overlap percentage.

* * * * *